United States Patent [19]
Kataoka et al.

[11] Patent Number: 5,304,898
[45] Date of Patent: Apr. 19, 1994

[54] HIGH VOLTAGE GENERATING CIRCUIT

[75] Inventors: Rieko Kataoka, Yamato; Masaki Kobayashi, Machida, both of Japan

[73] Assignee: International Business Machines Corporation, Armonk, N.Y.

[21] Appl. No.: 984,193

[22] Filed: Nov. 20, 1992

[30] Foreign Application Priority Data

Dec. 4, 1991 [JP] Japan .................................. 3-320230

[51] Int. Cl.$^5$ .............................................. H01J 29/70
[52] U.S. Cl. ..................................... 315/411; 348/730; 348/377
[58] Field of Search .................. 315/411; 358/190, 243

[56] References Cited

U.S. PATENT DOCUMENTS

| | | | |
|---|---|---|---|
| 4,642,744 | 2/1987 | Thomas | 358/190 |
| 4,808,906 | 2/1989 | Liepe | 358/190 |
| 5,059,874 | 10/1991 | Oliver | 315/411 |

*Primary Examiner*—Theodore M. Blum
*Attorney, Agent, or Firm*—Blaney Harper; Stephen C. Kaufman

[57] ABSTRACT

The objects of the present invention are achieved by forming a high voltage generating circuit which comprises: a flyback transformer having a primary winding and a secondary winding; means for supplying pulses of first frequency to the primary winding; a smoothing capacitor connected across the secondary winding; an output line connected to one terminal of the smoothing capacitor; means for detecting a variation of high voltage on the output line to generate compensating voltage pulses of a second frequency which is higher than the first frequency for compensating the variation of high voltage to supply the compensating voltage pulses to the other terminal of the smoothing capacitor. Additionally, a low pass filter is connected between the other terminal of the smoothing capacitor and the secondary winding, which prevents the compensating voltage pulses from being supplied to the secondary winding. Further, a capacitor is connected between the other terminal of the smoothing capacitor and a reference potential. Moreover, the first frequency is equal to a horizontal deflection frequency of a cathode ray tube, and the second frequency is N times as large as the first frequency, wherein N is integer larger than 1. The first frequency could also be 1/N times as small as a horizontal deflection frequency, wherein N is integer larger than 1, and the second frequency is equal to the horizontal deflection frequency. Finally, the output line is connected to an anode of a cathode ray tube.

6 Claims, 4 Drawing Sheets

HIGH VOLTAGE GENERATING CIRCUIT

FIELD OF INVENTION

The invention generally relates to a high voltage generating circuit. More specificially, this invention relates to a high voltage generating circuit including a flyback transformer for a CRT monitor. In particular, this invention relates to a high voltage generating circuit for a high definition CRT monitor of a personal computer or of a television receiver.

BACKGROUND

A cathode ray tube (CRT) display device has been used for displaying output data or images from, among other things, a TV receiver or a personal computer. The CRT display device includes a horizontal deflection circuit for deflecting an electron beam in a horizontal direction. The TV receiver or the personal computer (PC) supplies the horizontal synchronizing pulses to a horizontal deflection control circuit which supplies driving pulses to the horizontal deflection circuit. The horizontal deflection circuit supplies a sawtooth waveform to a horizontal deflection coil for deflecting the beam in the horizontal direction. The beam is deflected from a start position to an end position in one direction for displaying the image during a tracing period, and is deflected from the end position to the start position of the next scan line in an opposite direction during a re-tracing period. A pulse during the re-tracing period is supplied to a flyback transformer circuit, which generates at a secondary winding a high voltage, such as 25K volts, and supplies it to an anode of the CRT for accelerating the beam.

A smoothing capacitor is connected in parallel to the secondary winding and is charged by the high voltage during the re-tracing period. The charge stored in the smoothing capacitor is discharged through the anode circuit which forms a discharging circuit during the tracing period. A horizontal width of display area varies if the high voltage becomes unstable, and as a result, it is desirable to regulate or stabilize the high voltage on the smoothing capacitor.

Various efforts have been made to regulate the high voltage on the smoothing capacitor. Japanese patent application No. 63-261771 (Published Unexamined Patent Application No. 02-108373) discloses that an output voltage of an auxiliary transformer which is magnetically decoupled from the flyback transformer is added to a high voltage of the flyback transformer during the re-tracing period to compensate the variation of the voltage. Although the decoupling of the auxiliary transformer reduces a variation of the horizontal deflection waveform at the primary winding of the flyback transformer caused by the added compensating voltage, the horizontal deflection waveform is actually varied since the addition of the auxiliary voltage to the voltage of the secondary winding of the flyback transformer is transmitted to the primary winding of the flyback transformer. A small variation, such as 4%, of the horizontal deflection waveform could be allowed in the CRT display device of the current TV system, which has a ratio of 4 (horizontal) to 3 (vertical). However, such a small variation (4%) could not be allowed in the CRT display device of a high definition TV system, which has a ratio of 16 (horizontal) to 9 (vertical), or a high resolution CRT monitor of 1000×1000 pels, since the small variation becomes noticeable in the latter case.

OBJECT OF THE INVENTION

It is an object of the present invention to provide and improved high voltage generating circuit.

It is a further object of the present invention to provide an improved high voltage generating circuit wherein a variation of a high voltage on the output line of the flyback transformer is decreased.

SUMMARY OF INVENTION

The objects of the present invention are achieved by forming a high voltage generating circuit which comprises: a flyback transformer having a primary winding and a secondary winding; means for supplying pulses of first frequency to the primary winding; a smoothing capacitor connected across the secondary winding; an output line connected to one terminal of the smoothing capacitor; means for detecting a variation of high voltage on the output line to generate compensating voltage pulses of a second frequency which is higher than the first frequency for compensating the variation of high voltage to supply the compensating voltage pulses to the other terminal of the smoothing capacitor. Additionally, a low pass filter is connected between the other terminal of the smoothing capacitor and the secondary winding, which prevents the compensating voltage pulses from being supplied to the secondary winding. Further, a capacitor is connected between the other terminal of the smoothing capacitor and a reference potential. Moreover, the first frequency is equal to a horizontal deflection frequency of a cathode ray tube, and the second frequency is N times as large as the first frequency, wherein N is integer larger than 1. The first frequency could also be 1/N times as small as a horizontal deflection frequency, wherein N is integer larger than 1, and the second frequency is equal to the horizontal deflection frequency. Finally, the output line is connected to an anode of a cathode ray tube.

DESCRIPTION OF THE PREFERRED EMBODIMENT OF THE INVENTION

Figure 1:
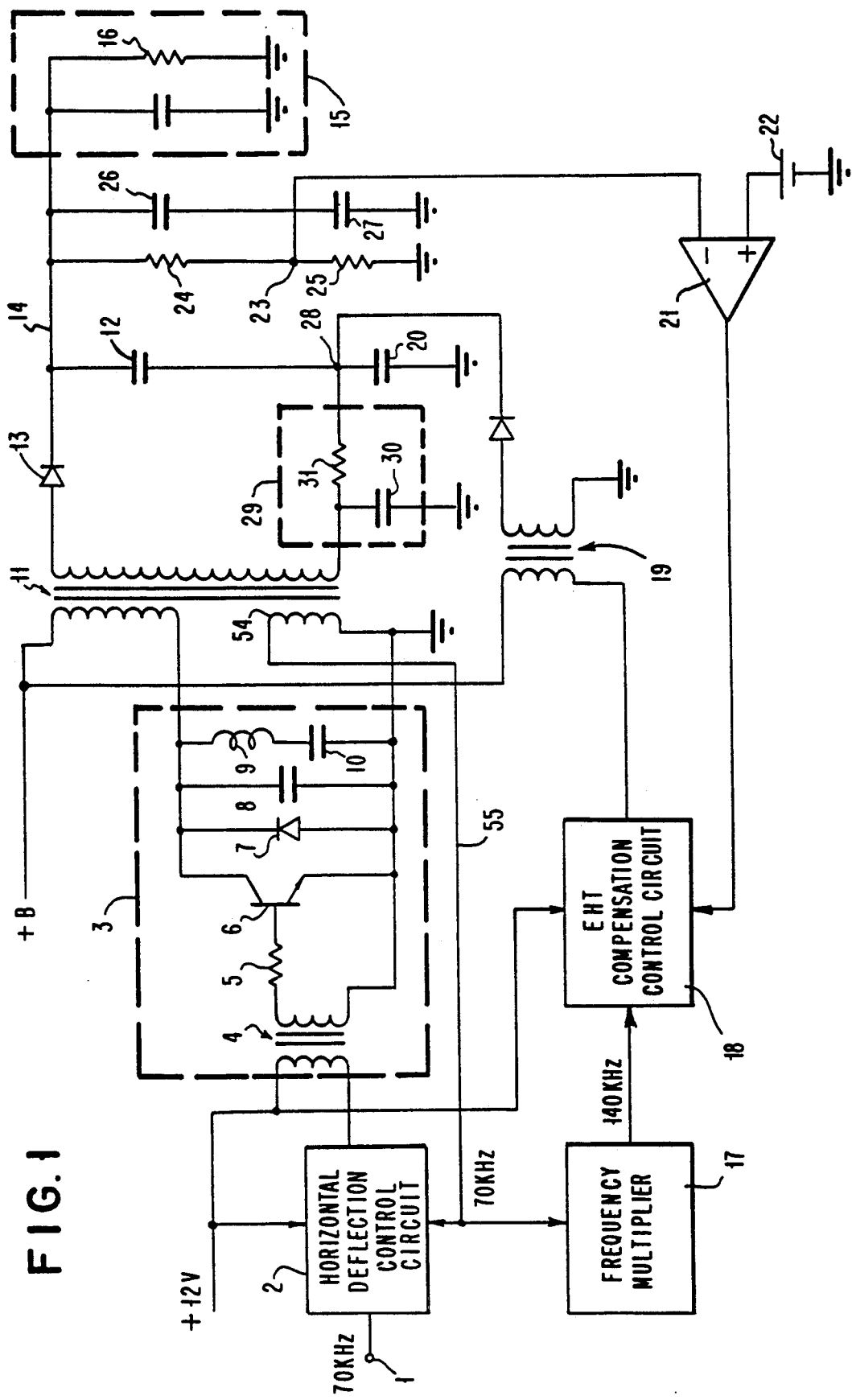
FIG. 1 shows the first embodiment of the high voltage generating circuit in accordance with the present invention.

FIG. 1 shows a first embodiment of the present invention. An input terminal 1 of a horizontal deflection control circuit 2 is connected to an output terminal of horizontal synchronizing pulses of a TV receiver or a personal computer. The horizontal deflection control circuit 2 is a well known circuit in the art, and includes a phase lock loop circuit which is triggered by the horizontal synchronizing pulse, for example 70 KHz, to generate a driving pulse in synchronism with the horizontal synchronous pulses. An output of the circuit 2 is connected to a horizontal deflection circuit 3, which includes a driving transformer 4, a resister 5, a transistor 6, a diode 7, capacitors 8 and 10, and a deflection coil 9. The horizontal deflection circuit 3 is well known in the art and hence the detail operation is not described. An output of the horizontal deflection circuit 3 is connected to a flyback transformer (FBT) 11, which charges a smoothing capacitor 12 through a diode 13. A high DC voltage, which is called as EHT, extremely high tension, is generated on an output line 14.

Figure 2:
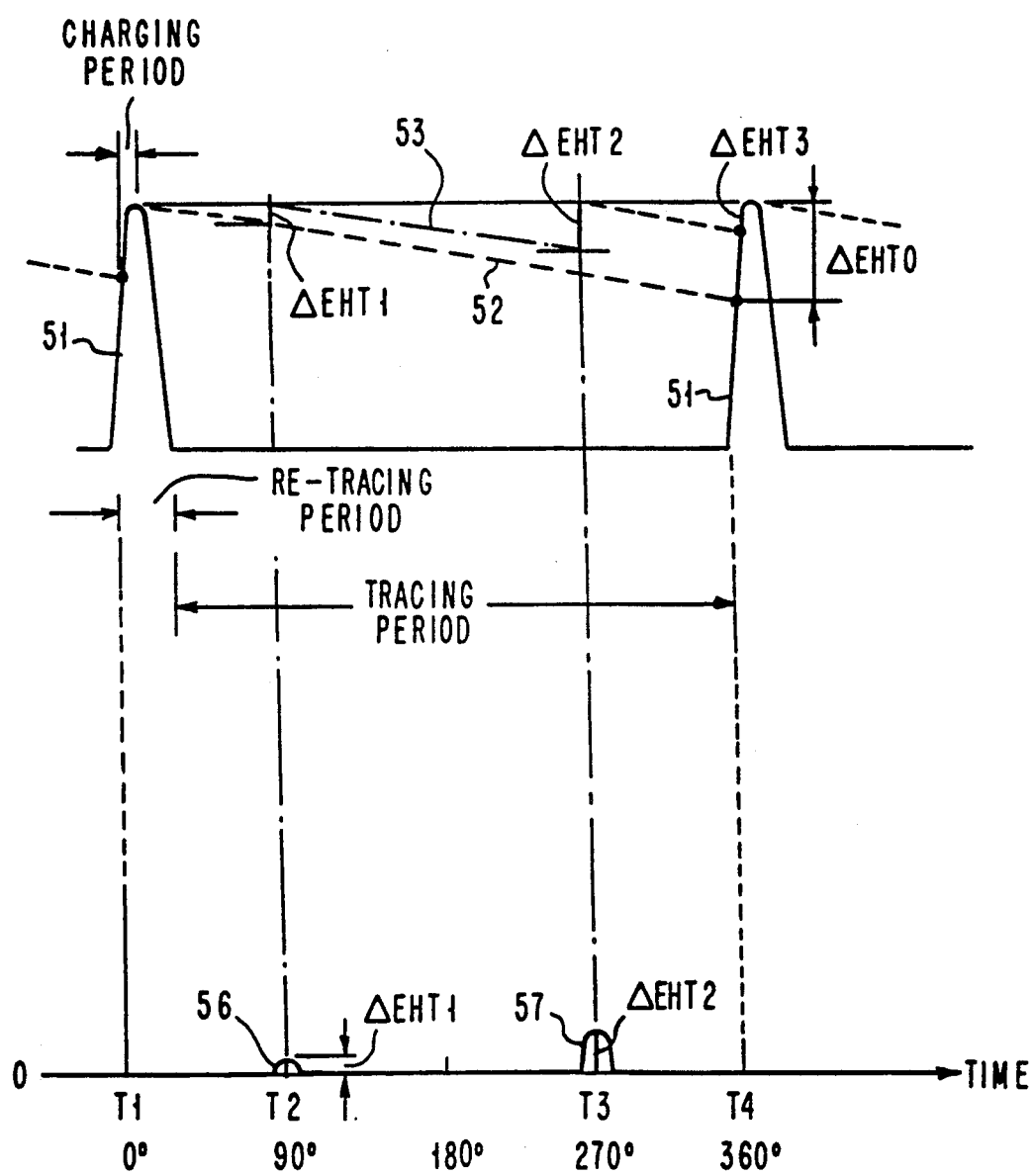
FIG. 2 shows the waveforms describing the compensation of the high voltage on the output line of the FBT in accordance with present invention.

FIG. 2 illustrates the generation of the prior art EHT 52 at the output 14 of the smoothing capacitor 12 during the flyback or retracing period from the pulses 51 supplied from the horizontal deflection circuit 3 to the FBT 11. The smoothing capacitor 12 is charged to a high voltage, for example 25 KV by a leading edge of the pulse 51 during a charging period. The output line 14 is connected to an anode 15 of CRT. The EHT at the capacitor 12 is gradually discharged through a resistor 16 of the anode during the tracing period, as shown by EHT0. If the EHT becomes low, the size of a display area of the CRT becomes large. Particularly, a loss caused by cores and windings remarkably increases in a high resolution CRT monitor of 1280×1280 dots and a high definition TV (HDTV) of 2000×2000 dots, and the EHT0 of 600 1200 V is observed. It is desired to keep the EHT0 small.

FIG. 2 also illustrates a waveform 53 of the present invention having EHT1, EHT2 and EHT3 which are smaller than the EHT0. The horizontal deflection control circuit 2 of FIG. 1 operates at a predetermined frequency, e.g. 70 KHz. A feedback line 55 including a winding 54 is provided for performing an automatic frequency control. The pulses of 70 KHz are supplied to a frequency multiplier 17 which generates pulse train of 140 KHz with a phase shift of 90 degrees from the pulses of 70 KHz. The pulses of 140 KHz are applied to an EHT compensation control circuit 18, which responds an error signal from a differential amplifier 21 operating as an error detector to supply AC driving pulses to a driving transformer 19. The EHT compensation control circuit 18 is well known in the art, and includes a switching transistor. In response to the error signal, a turn-on period of the switching transistor is controlled, so that a compensating voltage is generated on a secondary winding of the driving transformer 19 and supplied to a node 28 between the capacitors 12 and 20. One of inputs of the differential amplifier 21 is connected to a reference voltage 22, and the other input is connected to a node 23 between a resistor 24 and a resistor 25 and between a capacitor 26 and a capacitor 27. A sampled voltage at the node 23 is compared with the reference voltage 22 by the differential amplifier 21.

The EHT compensation control circuit 18 and the driving transformer 19 generates compensating voltages 56 and 57 of the frequency of 140 KHz as shown in the FIG. 2. The phase of the voltages 56 and 57 of 140 KHz is shifted from the phase of the pulses 51 of 70 KHz by 90 degrees. More particularly, the pulses 51 are applied to the primary winding of the FBT 11 at time T1, and the EHT, i.e. the high voltage 25 KV, is generated on the secondary winding to charge the smoothing capacitor 12 to the 25 KV. After the charging operation the voltage on the line 14 is gradually decreased due to the discharge through the resistor 16 of the anode 15. The decrease of the high voltage on the line 14 is detected by the differential amplifier 21. At the time T2, one of 140 KHz pulses is supplied from the frequency multiplier 17 to the EHT compensation control circuit 18. The circuit 18 is triggered by the pulse to respond to the error signal from the differential amplifier 21, to supply the voltage waveform to the primary winding of the driving transformer 19, thereby the compensating voltage 56, shown in the FIG. 2, is generated on the secondary winding of the driving transformer 19. The time period of the voltage waveform is determined by the error signal. The error signal at the time T2 represents the decrease of the high voltage on the output line 14, i.e. EHT1 in the FIG. 2, and the compensating voltage 56 is equal to the EHT1. This compensating voltage EHT1 is applied to the node 28 between the capacitor 12 and the capacitor 20, thereby the voltage on the upper electrode of the capacitor 12 is raised by the EHT1, resulting that the voltage on the output line 14 is increased to the initial voltage 25 KV.

During a time period between the time T2 and the time T3, the voltage on the output line 14 is gradually decreased, as shown by the waveform 53 in the FIG. 2, due to the discharge through the anode 15 of the CRT. At the time T3, the next pulse of 140 KHz is supplied from the frequency multiplier 17 to the EHT compensation control circuit 18. At this time T3, the differential amplifier 21 generates the error signal representing the decrease of voltage, i.e. EHT2, on the output line 14. The EHT compensation control circuit 18 is triggered by the pulse to supply the voltage waveform, the time period of which is determined by the error signal, to the primary winding of the driving transformer 19, so that the compensating voltage which is equal to EHT2 is generated on the secondary winding of the driving transformer 19. The compensating voltage EHT2 is applied to the node 28, thereby the voltage on the output line 14 is increased to the initial voltage 25 KV. The same compensating operation is performed at the time T4, which is just before the application of the next pulse 51 to the FBT 11.

A low pass filter 29 including a capacitor 30 and a resistor 31 is connected between the node 28 and the lower end of the secondary winding of the FBT 11, in accordance with the present invention. The purpose of the low pass filter 29 is to prevent the compensating voltage 56 and 57 from being supplied to the secondary winding of the FBT 11. If the compensating voltage is transmitted to the primary winding through the secondary winding, the horizontal deflection waveform is varied. This variation must be removed in the HDTV, as described hereinbefore.

In the first embodiment shown in the FIG. 1, the FBT 11 is directly driven by the pulse 51 of the horizontal deflection frequently of 70 KHz, since the FBT operable at the 70 KHz is currently available. The 70 KHz is required for the CRT monitor of 1280×1024 pels. The FBT 11 in the FIG. 1 is also operated as a horizontal deflection transformer, i.e. an output transformer, of the horizontal deflection circuit 3.

Recently developed high resolution CRT display device of 2000×2000 pels requires the horizontal deflection frequency of 130 KHz. The currently available FBT can not operate at the 130 KHz frequency. In the second embodiment of the present invention shown in FIG. 3, the horizontal deflection circuit 3 operating at 130 KHz has a horizontal deflection transformer 32, which does not operate as the FBT. The transformer 32 is a normal type transformer which can operate at 500 KHz-1 MHz. To perform the compensating operation of the present invention, a separate FBT 11 is additionally provided, which is operable at 65 KHz driving pulses. In the FIG. 3, the same reference numbers as that in the FIG. 1 are used for the same circuit elements.

The horizontal deflection circuit 3 has its own horizontal deflection transformer 32, and a separate FBT driving circuit including an EHT control circuit 34 and a driving circuit 33 is provided. The operation of the EHT control circuit 34 is substantially the same as that of the horizontal deflection control circuit 2, except the circuit 34 is supplied with the pulses of 65 KHz. The operation of the driving circuit 33 is substantially the same as that of the horizontal deflection circuit 3, except the circuit 33 does not include the horizontal deflection coil 9 and the capacitor 10.

Figure 3:
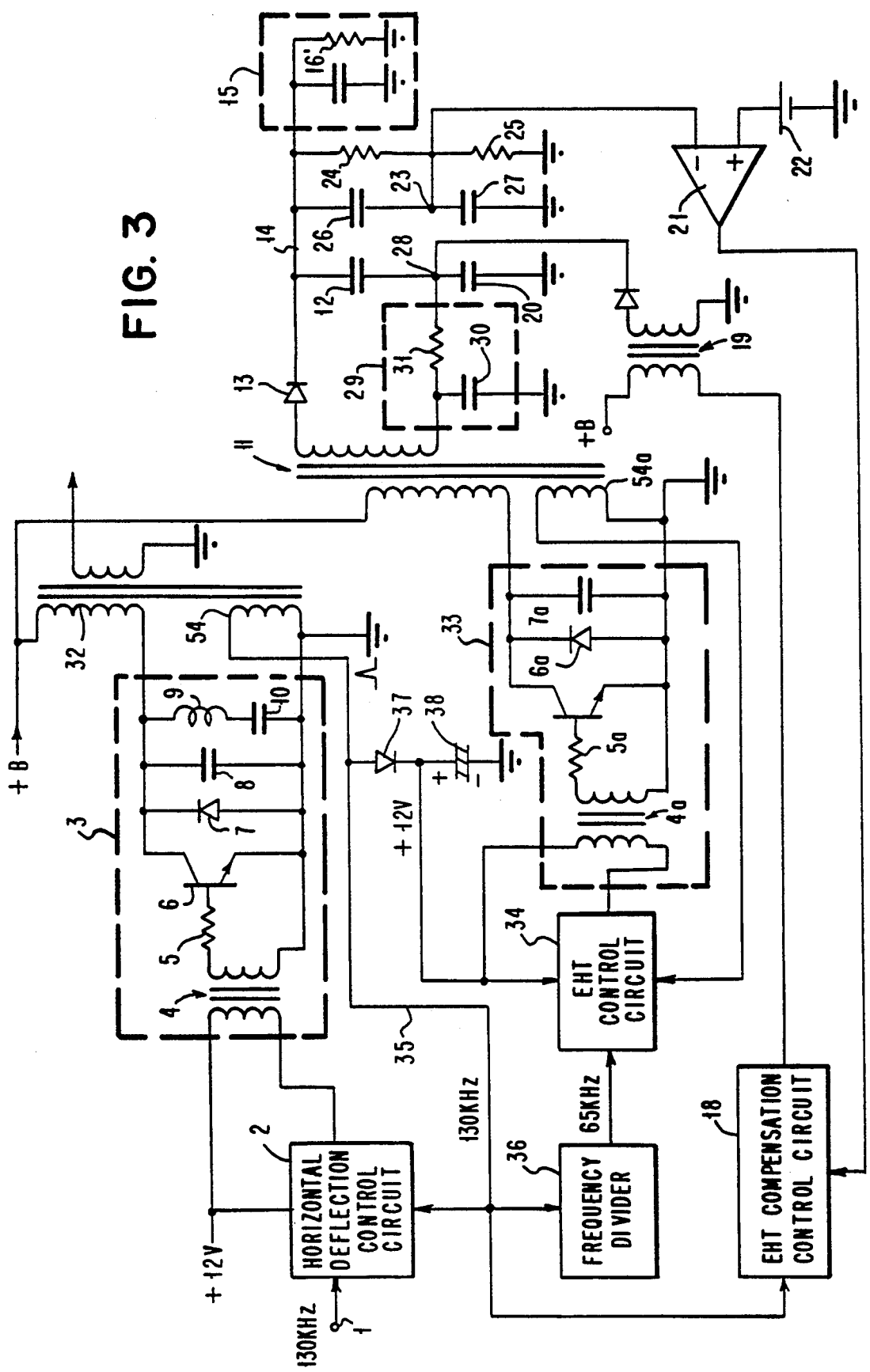
FIG. 3 shows the second embodiment of the high voltage generating circuit in accordance with the present invention.

The pulses of 130 KHz on a feedback loop 35 of the horizontal deflection control circuit 2 are supplied to a frequency divider 36 and the EHT compensation control circuit 18. The divider 36 supplies the pulses of 65 KHz to the EHT control circuit 34. The EHT compensation control circuit 18 in the FIG. 3 is the same circuit as the circuit 18 in the FIG. 1, except the circuit 18 in the FIG. 3 operates at 130 KHz frequency. And, the remaining circuit configuration in the FIG. 3, such as the driving transformer 19, the low pass filter 29, the differential amplifier 21, the anode 15 of the CRT, etc., are substantially the same as that in the FIG. 1. A diode 37 and a capacitor operate as a voltage source for the circuit 34 and the transformer 4a.

Since the same compensating operation as that in the FIG. 1 is performed in the circuit of the FIG. 3, the operation of the FIG. 3 is briefly described with refer to the FIG. 2. The EHT control circuit 34 and the driving circuit 33 supply the driving pulses 51 of 65 KHz to the FBT 11. The phase of the 65 KHz pulses is shifted from the 130 KHz pulses by 90 degrees. That is, the 65 KHz driving pulses 51 are applied to the FBT 11 at 0 degree and 360 degrees in the FIG. 2, and the compensating voltages 56 and 57 of the 130 KHz frequency are supplied to the node 28 at 90 degrees and 270 degrees, respectively, so that the voltage on the output line 14 of the FIG. 3 is increased to the 25 KV level at 90 and 270 degrees, as described with respect to the FIG. 1.

Figure 4:
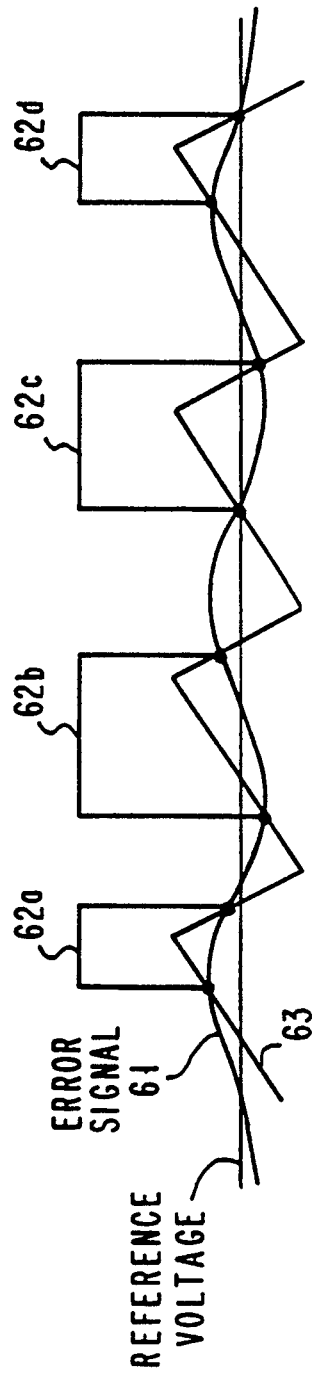
FIG. 4 shows the operation of the EHT compensation control circuit 18.
Figure 5:
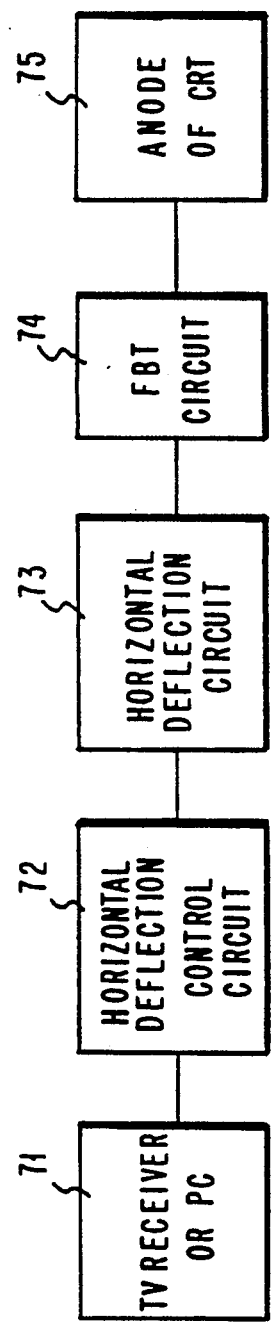
FIG. 5 shows the circuit configuration of prior art.

FIG. 4 shows the operation of the EHT compensation control circuit 18 as explained with respect to FIGS. 1 and 3. The error signal 61 is generated by the differential amplifier 21. A sawtooth waveform 63 is superimposed over the error signal 61. The crosspoints of the error signal 61 and the sawtooth waveform 63 determine the width of the driving pulse 62a 62d. That is, the width of the driving pulse 62a 62d supplied to the driving transformer 19 is determined by the error signal 61.

In the embodiments of the present invention, the compensating voltage pulses of the frequency which is N times (where N=2) as large as the frequency of the driving pulses applied to the primary winding of the FBT are generated by the EHT compensation control circuit 18. However, the compensating voltage pulses of a frequency which is 3 times through ten times (N=3 through N=10) as large as the frequency of the driving pulse applied to the FBT can be used to provide more precise compensation operation.

While the invention has been described and illustrated with respect to plural embodiments thereof, it will be understood by those skilled in the art that various changes in the detail may be made therein without departing from the spirit, scope, and teaching of the invention. Therefore, the invention disclosed herein is to be limited only as specified in the following claims.

We claim:

1. A high voltage generating circuit, comprising:
   a flyback transformer having a primary winding and a secondary winding;
   a means for supplying pulses of first frequency to said primary winding;
   a smoothing capacitor connected across said secondary winding;
   an output line connected to one terminal of said smoothing capacitor;
   a detection means for detecting a variation of high voltage on said output line, said detection means generating compensating voltage pulses of a second frequency which is higher than said first frequency;
   said detection means coupled to a second terminal of said smoothing capacitor to supply said compensating voltage pulses to said second terminal for compensating said variation of high voltage.

2. A high voltage generating circuit according to claim 1, further comprising:
   a low pass filter connected between said second terminal of said smoothing capacitor and said secondary winding, said low pass filter prevents said compensating voltage pulses from being supplied to said secondary winding.

3. A high voltage generating circuit according to claim 2, further comprising;
   a capacitor connected between said second terminal of said smoothing capacitor and a reference potential.

4. A high voltage generating circuit according to claim 3, wherein:
   said first frequency is equal to a horizontal deflection frequency of a cathode ray tube, and said second frequency is N times as large as said first frequency, wherein N is integer larger than 1.

5. A high voltage generating circuit according to claim 3, wherein:
   said first frequency is 1/N times as small as a horizontal deflection frequency, wherein N is integer larger than 1, and said second frequency is equal to said horizontal deflection frequency.

6. A high voltage generating circuit according to claim 3, wherein:
   said output line is connected to an anode of a cathode ray tube.

* * * * *